United States Patent [19]

Romesburg

[11] Patent Number: 4,768,083
[45] Date of Patent: Aug. 30, 1988

[54] DIGITAL TV HAVING ON-SCREEN DISPLAY FEATURE

[75] Inventor: Eric D. Romesburg, Indianapolis, Ind.

[73] Assignee: RCA Licensing Corporation, Princeton, N.J.

[21] Appl. No.: 43,770

[22] Filed: Apr. 29, 1987

[51] Int. Cl.⁴ .................... H04N 5/262; H04N 5/268
[52] U.S. Cl. ................................ 358/22; 358/181; 358/183
[58] Field of Search .................... 358/22, 181, 183

[56] References Cited

U.S. PATENT DOCUMENTS

| | | | |
|---|---|---|---|
| 3,812,285 | 5/1974 | Miyata et al. | 178/5.8 |
| 4,249,212 | 2/1981 | Ito | 358/22 |
| 4,559,561 | 12/1985 | Amano et al. | 358/192.1 |
| 4,638,360 | 1/1987 | Christopher et al. | 358/148 |
| 4,665,438 | 5/1987 | Miron | 358/181 |

*Primary Examiner*—Tommy P. Chin
*Attorney, Agent, or Firm*—Paul J. Rasmussen; Eric P. Herrmann; Kenneth N. Nigon

[57] ABSTRACT

A television pix-in-pix system includes a pixel memory for storing one field of pixel intensity values of a television signal. A 1-bit overlay indication signal representative of pixel address locations defining a desired indicia on the TV screen is stored in an associated bit map memory. A digital multiplexor having input terminals coupled for respectively receiving the pixel intensity values and suitable overlay display values, and responsive to the overlay indication signal, provides the overlay display values when the overlay indication signal is a logical one, and provides the pixel intensity values otherwise, thereby generating the desired indicia as a part of the inset image on the TV screen.

8 Claims, 2 Drawing Sheets

DIGITAL TV HAVING ON-SCREEN DISPLAY FEATURE

This invention relates to a memory-based digital TV system, which selectively displays a desired indicia (e.g., channel number) on the TV screen.

BACKGROUND

In a digital television system having a picture-in-picture (PIP or pix-in-pix) feature, two images from possibly unrelated sources are displayed simultaneously on the TV screen as a single composite image. The composite image includes a small picture (defined by an auxiliary video signal, for example, from a VCR) displayed as an inset within a large main picture (defined by a primary video signal, for example, from the TV antenna). U.S. Pat. No. 4,638,360 issued to Christopher, et al., and entitled "TIMING CORRECTION FOR A PICTURE-IN-PICTURE TELEVISION SYSTEM", describes an illustrative PIP system.

It is desirable to identify the channel (e.g., stereo transmission, channel number, TV station code, network identification code, etc.) for the small inset picture. Labeling of the small inset picture is especially important when a number of small inset pictures (e.g., 16) from different channels are simultaneously displayed on the television screen, for example, in the multiple pix-in-pix or TV guide mode.

SUMMARY OF THE INVENTION

In accordance with the principles of the present invention, at least one field of an auxiliary or secondary digital video signal is stored in a first memory portion. A digital overlay indication signal, representative of pixel address locations defining a desired indicia (e.g., channel number), is stored in a second memory portion. A multiplexing means coupled for receiving the auxiliary video signal and an overlay display value, and responsive to the overlay indication signal, applies to an output port thereof the overlay display value when the overlay indication signal is in the first state and passes through the auxiliary video signal otherwise.

The output of the multiplexor is applied to a video switch along with the primary video signal. The video switch, responsive to a switching control signal, applies an appropriate one of the input signals to the kinescope for producing a composite image, wherein the desired indicia is displayed as a part of the small inset picture.

IN THE DRAWINGS

FIG. 1 is a schematic block diagram of a digital television receiver having a picture-in-picture feature, and incorporating the on-screen indicia display system of the subject invention; and FIG. 2 is a schematic block diagram of the subject on-screen indicia display system of FIG. 1.

DETAILED DESCRIPTION

Figure 1:
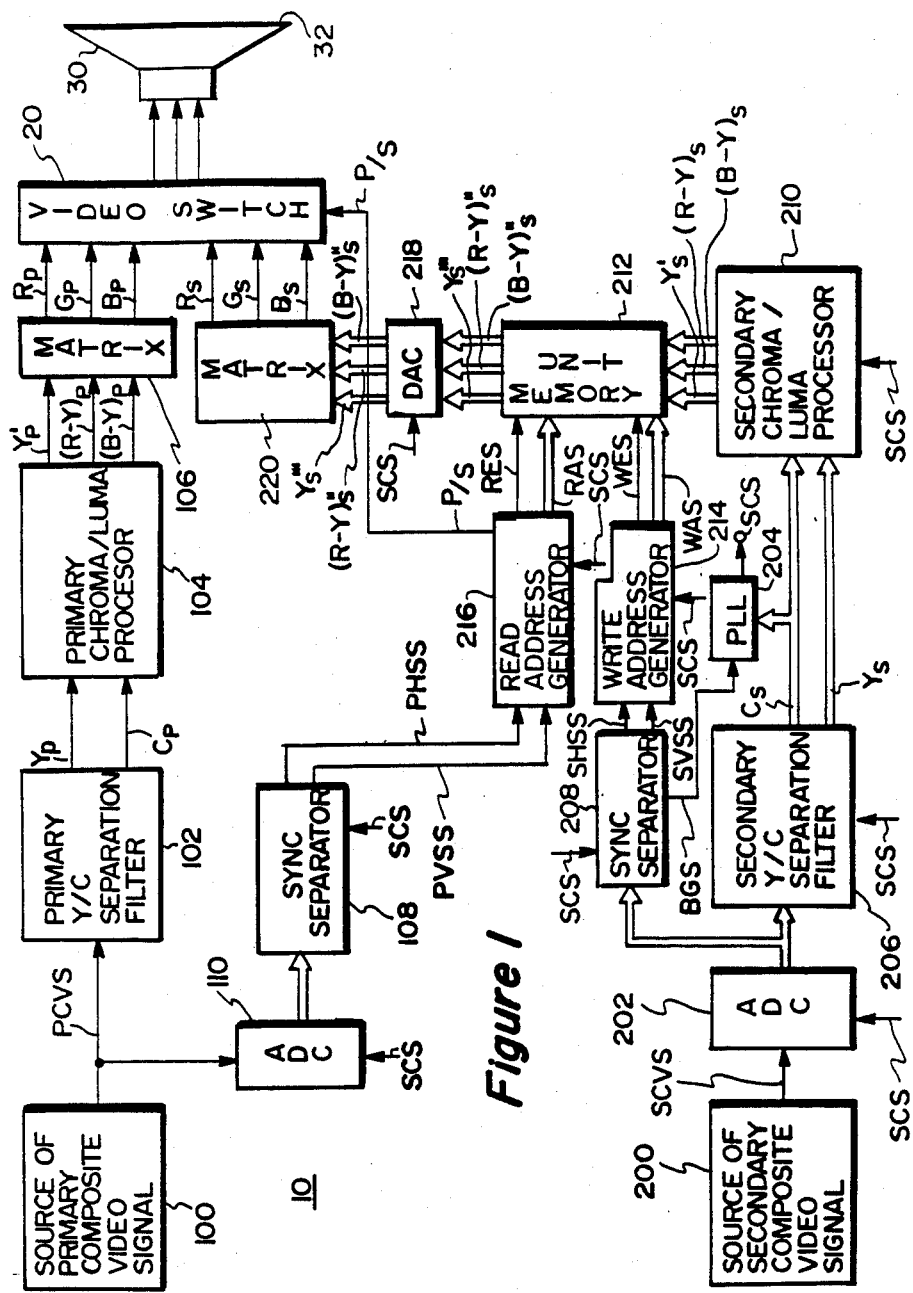

In the drawings, broad arrows represent buses for multibit parallel digital signals and line arrows represent connections carrying analog signals or single bit digital signals. Depending on the processing speed of the devices, compensating delays (not shown) may be required in certain signal paths.

FIG. 1 is a memory-based television receiver 10 of the type described in detail in the afore-mentioned U.S. patent (U.S. Pat. No. 4,638,360) issued to Christopher et al., and having a pix-in-pix feature. The receiver 10 generates a small inset picture within a large main picture on the screen 32 of a kinescope 30 when the receiver is in the pix-in-pix mode.

As previously indicated, the TV receiver processes video signals from two, possibly unrelated sources 100 and 200. The source 100 (e.g., TV antenna, tuner and IF circuits) provides a primary baseband composite video signal PCVS for generating a large main picture. The source 200 (e.g., VCR) supplies a secondary baseband composite video signal SCVS to produce a small inset picture within the large main picture.

It is assumed that the primary and secondary video signals PCVS and SCVS are processed in the analog and digital domains respectively. An analog video switch 20 coupled for receiving the primary and secondary color drive signals $R_P$, $G_P$, $B_P$ and $R_S$, $G_S$, $B_S$ applies an appropriate set of drive signals to the kinescope 30 in response to a primary/secondary switching signal P/S to produce a composite image on the screen 32.

The primary composite video signal PCVS is applied to a Y/C separation filter 102. The Y/C separation filter 102, which may include, for example, conventional low-pass and high-pass filters, separates the primary composite video signal PCVS into a primary luminance signal $Y_P$ and a primary chrominance signal $C_P$. The luminance and chrominance signals $Y_P$ and $C_P$ are applied to a chroma/luma processor 104 which may include, for example, (1) a band shaping filter for peaking the high frequency components of the luminance signal $Y_P$ to develop a signal $Y'_P$, and (2) a chroma demodulator for deriving the baseband color difference signals $(R-Y)_P$ and $(B-Y)_P$ from the chrominance signal $C_P$. The signal components $Y'_P$, $(R-Y)_P$, and $(B-Y)_P$ are applied to an RGB matrix 106 which combines the signal components to develop the color drive signals $R_P$, $G_P$ and $B_P$. These $R_P$, $G_P$ and $B_P$ signals are applied to one set of input terminals of the video switch 20, the output of which drives the kinescope 30. The color signals $R_S$, $G_S$ and $B_S$ developed from the secondary composite video signal SCVS are applied to the other set of input terminals of the video switch 20. These signals are developed by apparatus described below.

The source 20 of the secondary composite video signal SCVS may be a video cassette recorder (VCR). An analog-to-digital converter (ADC) 202 samples and digitizes (8 bits) the secondary composite video signal SCVS at instants determined by a sampling clock signal SCS. A phase-locked-loop (PLL) 204 generates the sampling clock signal SCS having a frequency which is four times the chrominance subcarrier frequency $F_{sc}$. The sampling clock signal SCS is phase locked to the color synchronizing burst component CBS of the secondary composite video signal SCVS.

When the secondary composite video signal SCVS originates from a non-standard source (e.g., VCR), the frequency of the horizontal synchronizing signal SHSS (included therein) may significantly vary from line to line, while the frequency of the color burst signal CBS may be relatively stable. This causes the phase of the sampling clock signal SCS (which is locked to the burst signal) relative to the horizontal sync signal SHSS to vary from horizontal line to horizontal line. The line-to-line phase variation of the sampling clock signal, in turn, causes a line-to-line variation in the horizontal position at which the picture elements or pixels are sampled. Consequently, the vertical lines in the small inset image may appear jagged. These timing or phase errors are known as "skew" errors. The aforesaid Christopher et al. patent (U.S. Pat. No. 4,638,360) discloses a technique for correcting skew errors in the non-standard video signals. The skew correction process is not a part of the present invention, and is, therefore, omitted from the description given below.

The ADC 202 applies digital representations of the secondary composite video signal SCVS to a Y/C separation filter 206 responsive to the clock signal SCS. The filter 206 may include, for example, (1) a finite impulse response (FIR) filter which passes the secondary chrominance signal $C_S$ of the composite video signal SCVS to the relative exclusion of the luminance signal $Y_S$ thereof, and (2) a subtracter for subtracting the chrominance signal $C_S$ from the secondary composite video signal SCVS to develop the luminance signal $Y_S$.

The ADC 202 also provides the digital samples representative of the secondary composite video signal SCVS to a sync separator 208. The sync separator 208 develops a secondary horizontal synchronizing signal SHSS, a secondary vertical synchronizing signal SVSS and a burst gate signal BGS from the digital representations of the secondary composite video signal SCVS. The digital sync separator 208 is of the type contained in the integrated circuit DPU 2532 manufactured by ITT Intermetall GmbH and described at pages 47–72 of the data book "DIGIT 2000 NTSC DOUBLE-SCAN VLSI DIGITAL TV SYSTEM" edition 1985/5 of ITT Intermetall, Freiburg, W. Germany.

The burst gate signal BGS and the chrominance signal $C_S$ are applied to the PLL 204. The PLL 204, for example—of the type described in U.S. Pat. No. 4,291,332, develops the 4 $F_{sc}$ sampling clock signal SCS, which is phase locked to the color burst signal CBS included in the secondary composite video signal SCVS.

The luminance signal $Y_S$ and the chrominance signal $C_S$ from the Y/C separation filter 206 are applied to a chroma/luma processor 210. The processor 210 may include, for example, (1) an FIR band shaping filter for peaking the frequency spectrum of the digital luminance signal $Y_S$ to provide a modified secondary luminance signal $Y'_S$, and (2) a digital chroma demodulator for developing the baseband secondary color difference signals $(R-Y)_S$ and $(B-Y)_S$.

The signals $Y'_S$, $(R-Y)_S$ and $(B-Y)_S$ are applied to a memory unit 212 where they are subsampled and stored under the control of a write address generator 214. The memory unit 212 includes a conventional random access memory having a sufficient number of storage cells to hold one field of the subsampled secondary video signal components $Y'_S$, $(R-Y)_S$ and $(B-Y)_S$. This memory may be organized as three separate field memories, one for the luminance signal $Y'_S$ and one each for the two color difference signals $(R-Y)_S$ and $(B-Y)_S$.

The write address generator 214 develops a write address signal WAS and a write enable signal WES from the sampling clock signal SCS and the secondary horizontal and vertical sync signals SHSS and SVSS respectively. The write address generator 214 operates to subsample the secondary signal components $Y'_S$, $(R-Y)_S$ and $(B-Y)_S$ (e.g., 3 to 1) both vertically and horizontally by providing the address values and enable signals to the memory unit 214 at appropriate times.

The signals $Y_S'''$, $(R-Y)_S''$ and $(B-Y)_S''$ representing the subsampled secondary inset image are read from the memory unit 212 under the control of a read address generator 216. The read address generator 216 develops a read address signal RAS, a read enable signal RES and the primary/secondary switching signal P/S in response to the clock signal SCS and the primary horizontal and vertical sync signals PHSS and PVSS respectively.

The read address generator 216 may, for example, (1) count pulses of the primary horizontal sync signal PHSS relative to the primary vertical sync signal PVSS, and (2) count pulses of the sampling clock signal SCS relative to the primary horizontal sync signal PHSS to determine when to initiate the read operation of the memory unit 212, and when to switch between the primary and secondary drive signals $R_P$, $G_P$, $B_P$ and $R_S$, $G_S$, $B_S$ applied to the video switch 20.

Exemplary circuitry for the write and read address generators 214 and 216 are described in U.S. Pat. No. 4,249,213, entitled "PICTURE-IN-PICTURE TELEVISION RECEIVER" and U.S. Pat. No. 4,139,860, entitled "TELEVISION RECEIVER EQUIPPED FOR SIMULTANEOUSLY SHOWING SEVERAL PROGRAMS".

It will be recalled that the read address generator 216 operates in response to the primary horizontal and vertical sync signals PHSS and PVSS respectively. To this end, the primary composite video signal PCVS is applied to digital sync separator 108. The sync separator 108 generates the primary horizontal and vertical sync signals PHSS and PVSS. The primary sync separator 108 may be a circuit identical to the secondary sync separator 208.

The signals $Y_S'''$, $(R-Y)_S''$ and $(B-Y)_S''$ provided by the memory unit 212 in synchronism with the clock signal SCS are applied to a digital-to-analog converter (DAC) 218. The DAC 218 provides the analog signals representing the subsampled (e.g., 3 to 1) secondary luminance signal $Y'_S$ and the secondary color difference signals $(R-Y)_S$ and $(B-Y)_S$ to an RGB matrix 220. The matrix 220 converts the secondary signal components $Y_S'''$, $(R-Y)_S''$ and $(B-Y)_S''$ into the secondary color drive signals $R_S$, $G_S$ and $B_S$ for application to the video switch 20 as set forth above.

The analog video switch 20 is controlled by the primary/secondary switching signal P/S provided by the read address generator 216 to apply either the primary drive signals $R_P$, $G_P$ and $B_P$ or the secondary drive signals $R_S$, $G_S$, and $B_S$ to the kinescope 30 to develop the composite pix-in-pix image with the desired indicia on the TV screen 32.

Figure 2:
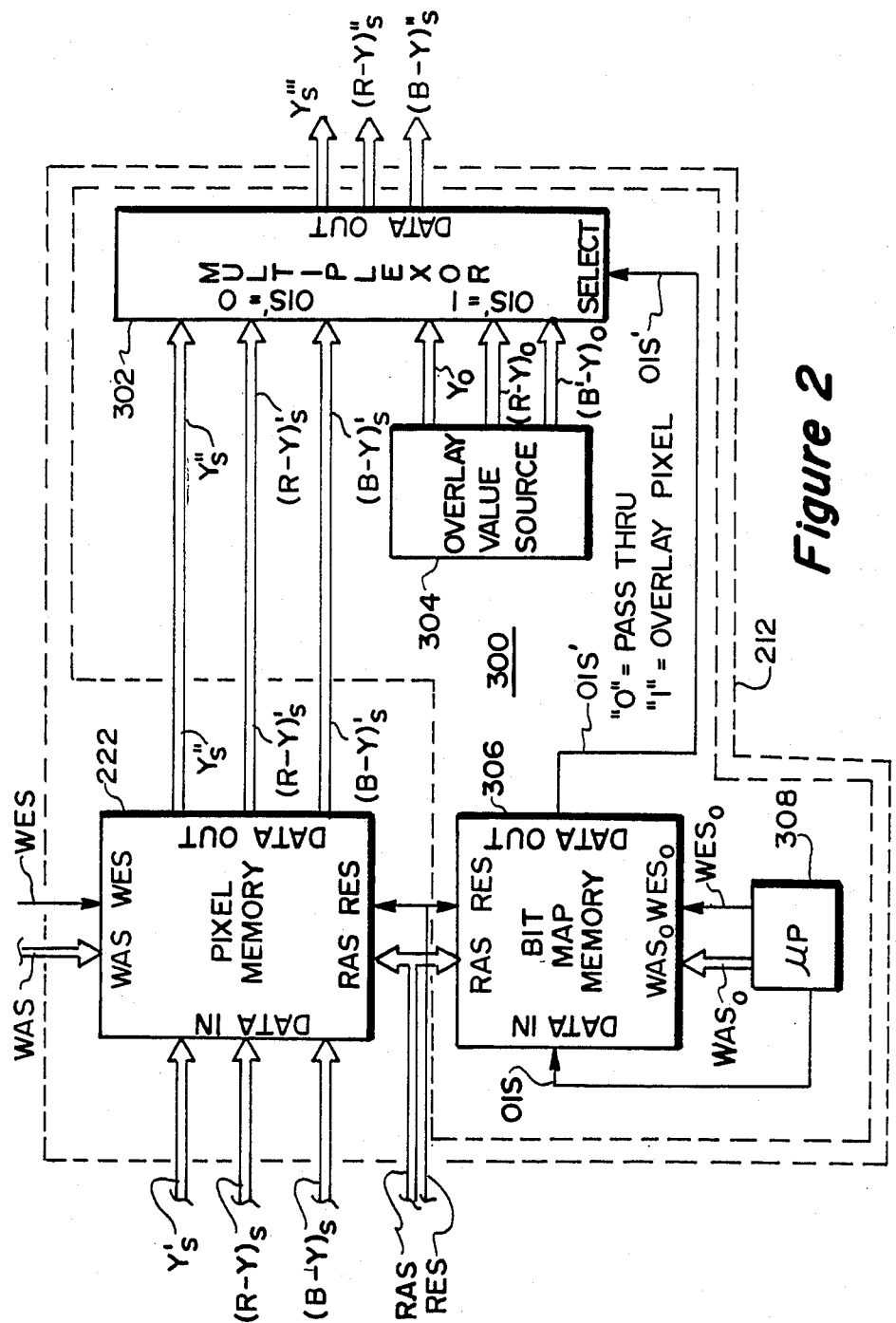

An apparatus 300 for generating the desired indicia (e.g., channel number) as a part of the inset image, in accordance with the present invention, will now be described in conjunction with FIG. 2. The indicia generating apparatus 300 is incorporated into the memory unit 212 as shown.

As previously indicated, the memory unit 212 includes a pixel memory 222 for storing one field of subsampled luminance signal $Y'_S$ and the two color difference signals $(R-Y)_S$ and $(B-Y)_S$ under the control of the write address generator 214. The luminance and the color difference signal values (i.e., the pixel intensity and color values) from the pixel memory 222 are applied to a first set of input terminals of a digital multiplexor 302 under the control of the read address generator 216. A source 304 of overlay (i.e., mask) intensity values $Y_O$, $(R-Y)_O$ and $(B-Y)_O$ is coupled to a second set of input terminals of the digital multiplexor 302.

The digital multiplexor 302 applies either the pixel intensity and color values from the pixel memory 222 or the overlay intensity and color values from the source 304 to the respective output terminals thereof in response to a 1-bit overlay indication signal OIS. The overlay indication signal OIS is conditioned to a logical one state when it is desirable to provide the overlay values at the output terminals of the digital multiplexor 302, and is conditioned to a logical zero state otherwise.

One field of the 1-bit overlay indication signal OIS is stored in a bit map memory 306 under the control of a microprocessor 308. There is a one-to-one correspondence between the pixel memory 222 and the bit map memory 306. Every address location in the bit map memory 306 corresponds to a certain address location in the pixel memory 222.

The microprocessor 308 generates the write address signal $WAS_O$ and the write enable signal $WES_O$ in addition to the overlay indication signal OIS such that the desired indicia is generated as a part of the inset picture. The microprocessor 308 (and not the write address generator 214) has an exclusive control over the writing of the overlay indication bits in the memory 306.

A bit map for generating a letter "I" is given below as an example of how the microprocessor 308 produces an overlay indication signal OIS for storage in the bit map memory 306. The letter "I" is illustratively defined herein by a logical "one" value stored in address locations (2,3) and (3,3), and a logical "zero" in all other storage locations of the bit map memory 306.

| | BIT MAP MEMORY | | | |
|---|---|---|---|---|
| | Column | | | |
| Row | 1 | 2 | 3 | 4 |
| 1 | 0 | 0 | 0 | 0 |
| 2 | 0 | 0 | 1 | 0 |
| 3 | 0 | 0 | 1 | 0 |
| 4 | 0 | 0 | 0 | 0 |

The overlay indication signal OIS' is read out from the bit map memory 306 under the control of the read address generator 216. This assures that the pixel intensity values (Y'', (R-Y)'$_S$ and (B-Y)'$_S$) and the accompanying overlay indication signal values (0 or 1) are read out simultaneously, both under the control of the read address generator 216.

As previously indicated, the digital multiplexor 302, responsive to the 1-bit overlay indication signal OIS' (from the bit map memory 306), substitutes suitable overlay display values $Y_O$, $(R-Y)_O$ and $(B-Y)_O$ from the source 304 for the respective pixel values to generate the desired indicia (e.g., caption "stereo") on the screen as a part of the inset image, when the overlay indication signal OIS is biased in a logical one state. Otherwise, the pixel values from the pixel memory 222 are passed unaffected to the DAC 218.

The magnitudes of the overlay display values $Y_O$, $(R-Y)_O$ and $(B-Y)_O$ are established to produce any suitable color and brightness level for the indicia displayed on the TV screen 32. For example, if all the overlay display values $Y_O$, $(R-Y)_O$ and $(B-Y)_O$ are equal, the displayed characters will be yellow, with intensity thereof determined by the selected level. On the other hand, if $(R-Y)_O$ and $(B-Y)_O$ are each set to zero, the displayed characters will range from black to white, depending upon the value of $Y_O$ signal.

Instead of using a separate bit map memory 306, it is possible to reserve a certain bit (e.g., LSB) of every video signal sample (e.g., 8 bit wide) in the pixel memory 222 for storing the bit map (i.e., the overlay indication signal OIS). This is particularly desirable if the video pixel has a bid width that is larger than required for a given application (e.g., pix-in-pix).

When the TV receiver is in the pix-in-pix mode, less-than-eight bits (e.g., 6 bits) are adequate for generating the small inset picture, thereby freeing up storage space in the pixel memory 222. In such a case, it would be possible to append the overlay indication bit to the less-than-eight-bit auxiliary video signal for storage in the pixel memory 222.

If it is desirable to restrict the captioning produced on the TV screen to a fixed area (e.g., upper left hand corner), then it is not necessary to have the capacity to store a full field of the 1-bit overlay indication signal OIS in the bit map memory 306. In that case, much smaller memory (i.e., less than a field) would be adequate for storing the bit map.

What is claimed is:

1. A television system including a source for providing a multibit digital video signal including a synchronizing signal in response to a system clock signal; said system comprising:

a first memory portion for storing a representation of at least one field of said multibit digital video signal;

means for generating a digital overlay indication signal representative of pixel address locations defining a desired indicia on the television screen;

a second memory portion for storing said digital overlay indication signal;

a source for supplying a digital overlay display value; and multiplexing means coupled for receiving said multibit digital video signal and said overlay display value, and responsive to said overlay indication signal, for applying to an output port thereof (1) said overlay display value when said overlay indication signal is in a first state, and (2) said multibit video signal when said overlay indication signal is in a second state.

2. The system defined in claim 1 wherein said multibit digital video signal comprises a luminance component Y and a pair of color difference components R-Y and B-Y; wherein said first memory portion stores one field of each of said video signal components Y, R-Y and B-Y; wherein said overlay display value comprises a luminance value $(Y_O)$ and a pair of color difference values $(R-Y)_O$ and $(B-Y)_O$; wherein said second memory portion stores one field of said overlay indication signal; wherein said multiplexing means substitutes said overlay display values $Y_O$, $(R-Y)_O$ and $(B-Y)_O$ for the respective pixel values Y, R-Y and B-Y of said video signal when said overlay indication signal is in said first state.

3. The system defined in claim 1 wherein said overlay indication signal is a 1-bit signal.

4. The system defined in claim 1 wherein said means for generating said digital overlay indication signal comprises a microprocessor.

5. The system defined in claim 4 further including write address generating means coupled to said first memory portion and responsive to said synchronizing signal and said clock signal for generating a first write address signal WAS and a first write enable signal WES for controlling the writing operation of said first memory portion; wherein said microprocessor generates a second write address signal $WAS_O$ and a second write enable signal $WES_O$ for controlling the writing operation of said second memory portion.

6. The system defined in claim 5 further comprising read address generating means coupled to said first and second memory portions and responsive to said clock signal for generating a read address signal RAS and a read enable signal RES for controlling the reading operations of said first and second memory portions.

7. The system defined in claim 6 wherein said multibit digital video signal is an auxiliary video signal; wherein said system further includes another source for providing a primary video signal including an associated synchronizing signal; wherein said system additionally includes means for forming a small picture signal defined by said auxiliary video signal within a large main picture signal defined by said primary video signal; wherein said read address generating means is additionally responsive to said associated synchronizing signal included in said primary video signal for generating said read address and read enable signals for controlling said reading operations.

8. The system defined in claim 1 wherein said desired indicia represents the channel number associated with the picture on the television screen.

* * * * *